United States Patent
Fujiwara (10) Patent No.: US 8,300,235 B2
(45) Date of Patent: Oct. 30, 2012

(54) IMAGE SCANNER CONFIGURED TO DETECT SIZE OF ORIGINAL

(75) Inventor: Shingo Fujiwara, Aichi (JP)

(73) Assignee: Brother Kogyo Kabushiki Kaisha, Aichi (JP)

(*) Notice: Subject to any disclaimer, the term of this patent is extended or adjusted under 35 U.S.C. 154(b) by 621 days.

(21) Appl. No.: 12/564,468

(22) Filed: Sep. 22, 2009

(65) Prior Publication Data

US 2010/0073694 A1    Mar. 25, 2010

(30) Foreign Application Priority Data

Sep. 22, 2008  (JP) ................. 2008-242835

(51) Int. Cl.
  *G06K 15/00*  (2006.01)
  *H04N 1/40*  (2006.01)
  *H04N 1/04*  (2006.01)

(52) U.S. Cl. ....... 358/1.12; 358/1.18; 358/449; 358/488

(58) Field of Classification Search ............... 358/1.12, 358/1.18, 449, 488
See application file for complete search history.

(56) References Cited

U.S. PATENT DOCUMENTS

| | | | |
|---|---|---|---|
| 7,558,524 B2* | 7/2009 | Ooshima et al. | 399/370 |
| 7,616,357 B2* | 11/2009 | Kikuchi | 358/486 |
| 7,813,010 B2* | 10/2010 | Michiie et al. | 358/474 |
| 2004/0165223 A1* | 8/2004 | Ishido et al. | 358/449 |
| 2004/0190089 A1* | 9/2004 | Tsutsumi | 358/505 |

FOREIGN PATENT DOCUMENTS

| | | |
|---|---|---|
| JP | 5-145710 | 6/1993 |
| JP | 2000-224387 | 8/2000 |
| JP | 2005-26949 | 1/2005 |
| JP | 2006-102364 | 4/2006 |
| JP | 2006-192636 | 7/2006 |

* cited by examiner

Primary Examiner — Twyler Haskins
Assistant Examiner — Fred Guillermety
(74) Attorney, Agent, or Firm — Scully, Scott, Murphy & Presser, PC (57) ABSTRACT

An image scanner has a scanning unit which captures an image of an original placed on a platen, a scanning unit moving mechanism which moves the scanning unit in an auxiliary scanning direction, and an image processing unit which processes the image of the original scanned by the scanning unit. The image processing unit includes a sheet size candidate determining unit which determines sheet size candidates based on a width of the original, and a scan/non-scan section determining unit which determines a non-scan section and a scan section based on the sheet size candidate. The scanning unit moving mechanism moves the scanning unit at a first speed in the scan section and at a second speed which is faster than the first speed, and the scanning unit scans the image of the original in the scan section and does not scan the image in the non-scan section.

16 Claims, 7 Drawing Sheets

| DETECTED WIDTH OF ORIGINAL (mm) | | | SHEET SIZE CANDIDATES | ADDITIONAL PRE-SCAN START POSITION (mm) |
|---|---|---|---|---|
| 21 | ~ | 26.9 | A10 | — |
| 27 | ~ | 31 | A10/B10 | 32 |
| 31.1 | ~ | 37 | B10/A9 | 40 |
| 37.1 | ~ | 39.9 | A9 | — |
| 40 | ~ | 42 | A9/B9 | 47 |
| 42.1 | ~ | 46.9 | B9 | — |
| 47 | ~ | 50 | B9/A8 | 59 |
| 50.1 | ~ | 57 | A8 | — |
| 59 | ~ | 68.9 | B8 | — |
| 69 | ~ | 69 | B8/A7 | 86 |
| 69.1 | ~ | 79 | A7 | — |
| 86 | ~ | 96 | B7 | — |
| 100 | ~ | 110 | A6 | — |
| 123 | ~ | 133 | B6 | — |
| 143 | ~ | 153 | A5 | — |
| 177 | ~ | 187 | B5 | — |
| 205 | ~ | 210.8 | A4 | — |
| 210.9 | ~ | 215 | Letter/A4/Legal | 274.4/292 |
| 216 | ~ | 220.9 | Letter/Legal | 274.4 |
| 252 | ~ | 262 | B4 | — |
| 274.4 | ~ | 284.4 | Ledger | — |
| 297 | ~ | 420 | A3 | — |

FIG. 6

| SHEET SIZE | SHEET WIDTH (mm) | SHEET LENGTH (mm) | TOLERANCE FOR SHEET WIDTH (mm) | | |
|---|---|---|---|---|---|
| A10 | 26 | 37 | 21 | ~ | 31 |
| B10 | 32 | 45 | 27 | ~ | 37 |
| A9 | 37 | 52 | 32 | ~ | 42 |
| B9 | 45 | 64 | 40 | ~ | 50 |
| A8 | 52 | 74 | 47 | ~ | 57 |
| B8 | 64 | 91 | 59 | ~ | 69 |
| A7 | 74 | 105 | 69 | ~ | 79 |
| B7 | 91 | 128 | 86 | ~ | 96 |
| A6 | 105 | 148 | 100 | ~ | 110 |
| B6 | 128 | 182 | 123 | ~ | 133 |
| A5 | 148 | 210 | 143 | ~ | 153 |
| B5 | 182 | 257 | 177 | ~ | 187 |
| A4 | 210 | 297 | 205 | ~ | 215 |
| Letter | 215.9 | 279.4 | 210.9 | ~ | 220.9 |
| Legal | 215.9 | 355.6 | 210.9 | ~ | 220.9 |
| B4 | 257 | 364 | 252 | ~ | 262 |
| Ledger | 279.4 | 431.8 | 274.4 | ~ | 284.4 |
| A3 | 297 | 420 | 292 | ~ | 302 |

IMAGE SCANNER CONFIGURED TO DETECT SIZE OF ORIGINAL

CROSS-REFERENCE TO RELATED APPLICATION

This application claims priority under 35 U.S.C. §119 from Japanese Patent Application No. 2008-242835 filed on Sep. 22, 2008. The entire subject matter of the application is incorporated herein by reference.

BACKGROUND

1. Technical Field

Aspects of the invention relate to an image scanner which detects a size of an original to be scanned.

2. Related Art

Conventionally, various techniques to detect a size of an original by a pre-scan are proposed. For example, there is known an image scanner configured to perform the pre-scan operation over a whole area of a platen, on which the original is placed, with a high-speed scanning in order to detect the size of the original before substantial scan.

However, a scanning speed of the pre-scan is limited because it takes a little time for processes to judge a sheet type, an image density and the like while the pre-scan operation. In addition, although a faster process for detecting the size of the original is desirable, its speed is also limited by the scanning speed of the pre-scan.

SUMMARY

Aspects of the invention provide an improved image scanner which detects a size of an original faster.

According to aspects of the present invention, there is provided an image scanner including a carriage, a driving mechanism and an image processing unit. The carriage emits light to an original, which is placed on a platen, along a main scanning direction, and the carriage is movable in an auxiliary scanning direction. The driving mechanism drives the carriage to move. The image processing unit processes image signal which is obtained based on light reflected from the original, and the image processing unit includes a candidate determining unit, a candidate length determining unit, a scan/non-scan section determining unit and a sheet size detecting unit. The candidate determining unit determines at least one candidate size of the original based on a pre-scan image of the original scanned at a position in the vicinity of one end, in the auxiliary scanning direction. The candidate length determining unit determines candidate lengths for the original if there are multiple candidate sizes. The scan/non-scan section determining unit determines a non-scan section and a scan section in the auxiliary scanning direction based on the candidate lengths. The sheet size detecting unit detects the size of the original based on the pre-scan image of the original scanned at the scan section. Furthermore, the driving mechanism, moves the carriage at a first speed in the scan section and at a second speed which is faster than the first speed, in the non-scan section.

According to aspects of the present invention, there is provided an image scanner including a scanning unit, a scanning unit moving mechanism and an image processing unit. The scanning unit captures an image, in a main scanning direction, of an original placed on a platen, and is movable in an auxiliary scanning direction. The scanning unit moving mechanism moves the scanning unit in the auxiliary scanning direction, and a two-dimensional image of the original is scanned as the scanning unit moves in the auxiliary scanning direction with capturing the image in the main scanning direction. The image processing unit processes the image of the original scanned by the scanning unit, and the image processing unit includes a candidate determining unit, a scan/non-scan section determining unit. The candidate determining unit determines at least one candidate size of the original based on a width of the original obtained by scanning a part of the image of the original at an initial position for scanning an area in the vicinity of one end, in the auxiliary scanning direction, of the original. The scan/non-scan section determining unit determines a non-scan section and a scan section in the auxiliary scanning direction based on the at least one candidate size. Furthermore, the scanning unit moving mechanism moves the scanning unit at a first speed in the scan section and at a second speed, which is faster than the first speed, in the non-scan section, and the scanning unit scans the image of the original in the scan section and does not scan the image in the non-scan section.

According to aspects of the present invention, there is provided a method of detecting a size of an original placed on a platen of an image scanner including an image scanning unit which scans an image of the original in a main scanning direction at a time and a scanning unit moving mechanism which moves the image scanning unit in an auxiliary scanning direction. The method includes a locating step, a first determining step, a second determining step, a moving step, an examining step and an identifying step. The locating step locates the scanning unit at an initial position to detect a width of the original. The first determining step determines at least one candidate size based on the detected width. The second determining step determines a non-scan section in which an end of the original would not exist and a scan section where the end of the original could exist, based on at least one candidate length corresponding to the at least one candidate size, in the auxiliary scanning direction. The moving step moves the scanning unit in the non-scan section at a first speed and scan section at a second speed, and the first speed being faster than the second speed. The examining step examines whether an end of the original is detected in the scan section. The identifying step identifies that the size of the original is the candidate size corresponding to the scan section when the end of the original is detected in the scan section.

DETAILED DESCRIPTION OF THE EMBODIMENT

Referring to the accompanying drawings, an exemplary embodiment according to aspects of the invention will be described. In the exemplary embodiment described hereafter, an MFP (Multi Function Peripheral) including a copy function, scanner function, a facsimile function and the cordless telephone function is described as an image scanner to which aspects of present invention are applied. It should be noted that the image scanner according to the exemplary embodiment of the present invention is applicable to a copier, a scanner device, facsimile device and the like.

Figure 1:
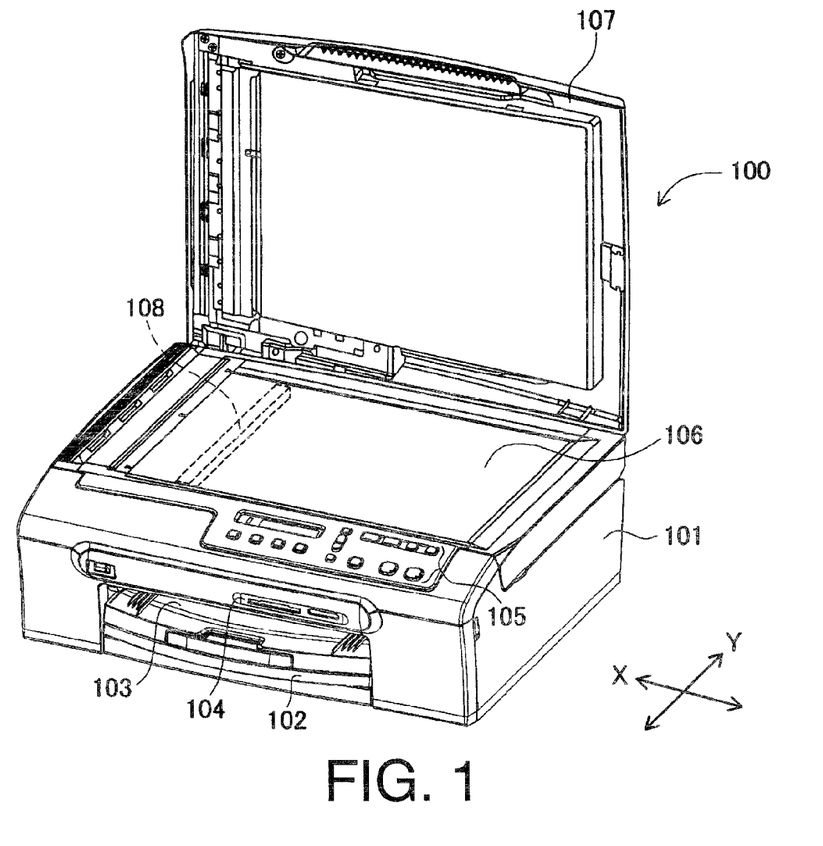
FIG. 1 is a perspective view showing an appearance of an MFP (Multi-Function Peripheral) according to an exemplary embodiment of the present invention.

As shown in FIG. 1, an image scanner 100 has a case 101 made of synthetic resin. A detachable sheet cassette 102, which accommodates a stack of print sheets, is provided in the case 100. The sheet cassette 102 is detached from/inserted in the case 100 through an opening formed on a front surface of the case 100. Above the sheet cassette 102, a discharging section 103 is defined, from which the print sheets are discharged.

Above the discharging section 103, a slot section 104 is provided. Various storage media such as memory cards can be inserted to the slot section 104. Retrieving image data stored in such a storage medium, the image data can be printed out by the image scanner 100.

On a part of a top surface of the image scanner 100, an operation panel 105 provided with various operation buttons and a liquid crystal display is provided. Furthermore, on the top surface of the image scanner 100, a platen 106 is provided on which an original to be scanned is placed. Above the top surface of the image scanner 100, a cover 107 is provided. The cover 107 is configured to be openable and closeable to the platen 106, and is closed when the original placed on the platen 106 is scanned.

In the image scanner 100, a carriage 108 and an imaging unit (not shown in FIG. 1) to capture an image of the original by detecting light, which is emitted by the carriage 108 and reflected by the sheet, are equipped. The carriage 108 equips a light source to emit light toward the original placed on the platen 106. The imaging unit captures the image of a part of the original in a main scanning direction (Y-direction in FIG. 1) by detecting the light reflected from the original with an image sensor such as a CCD. The carriage 108 is driven to move in an auxiliary scanning direction (X-direction in FIG. 1) by a drive belt (not shown) driven by a drive motor (not shown). Hereinafter, the drive motor and the driving belt are referred to as the drive mechanism for brevity. Note that, the drive mechanism may be arranged inside or outside the carriage 108.

In the image scanner 100, a printing mechanism is equipped. The printing mechanism prints out predetermined data (such as image data), which is acquired by scanning the original with the imaging unit, by retrieving data from the storage medium, or by receiving data from a computer (PC) through a communication interface, on a print sheet drawn from the sheet cassette 102. In the image scanner 100, a sheet feeding mechanism is equipped. The sheet feeding mechanism feeds, by the printing mechanism, the print sheet bearing a printed image toward the main scanning direction (Y-direction in FIG. 1).

Note that, as each configuration and/or operation of the imaging unit, the printing mechanism, and the sheet feeding mechanism is well-known, the detailed description thereof is omitted.

Figure 2:
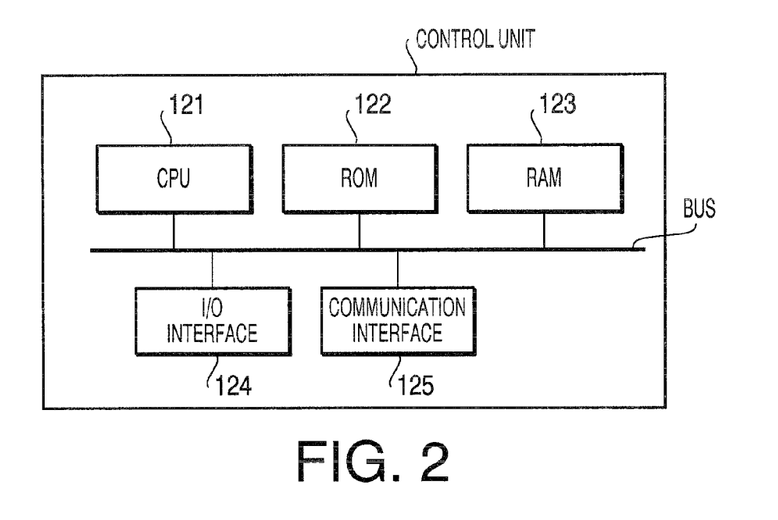
FIG. 2 is a block diagram schematically showing a control unit of the MFP according to the exemplary embodiment of the present invention.

In the image scanner 100, a control unit is provided. As shown in FIG. 2, the control unit includes a CPU (Central Processing Unit) 121, a ROM (Read Only Memory) 122, RAM (Random Access Memory) 123, an I/O (input/output) interface 124, and a communication interface 125. In addition, such components of the control unit are connected with each other via a bus through which various kinds of data is transmitted and/or received.

The CPU 121 controls a whole operation of the image scanner 100. In addition, the CPU 121 executes programs including a sheet size detecting process program described later. In the ROM 122, the programs and various tables (including a first table and a second table described later) are stored. The ROM 122 may be a flash memory. The RAM 123 is accessed to retrieve and/or store various pieces of data while the programs are executed by the CPU 121. In addition, the first table and the second table are developed in the RAM 123. Furthermore, image data generated by the imaging unit is stored in the RAM 123.

Various units and mechanisms, which include the operation panel 105, the carriage 108, the drive mechanism, the imaging unit, the printing mechanism, the sheet feeding mechanism and tile like, are connected to the I/O interface 124 through which various kinds of data is transmitted and/or received.

Note that, the internal configuration of the control unit shown in FIG. 2 is just an example, and it should be noted that the present invention is not limited to this internal configuration.

Figure 3:
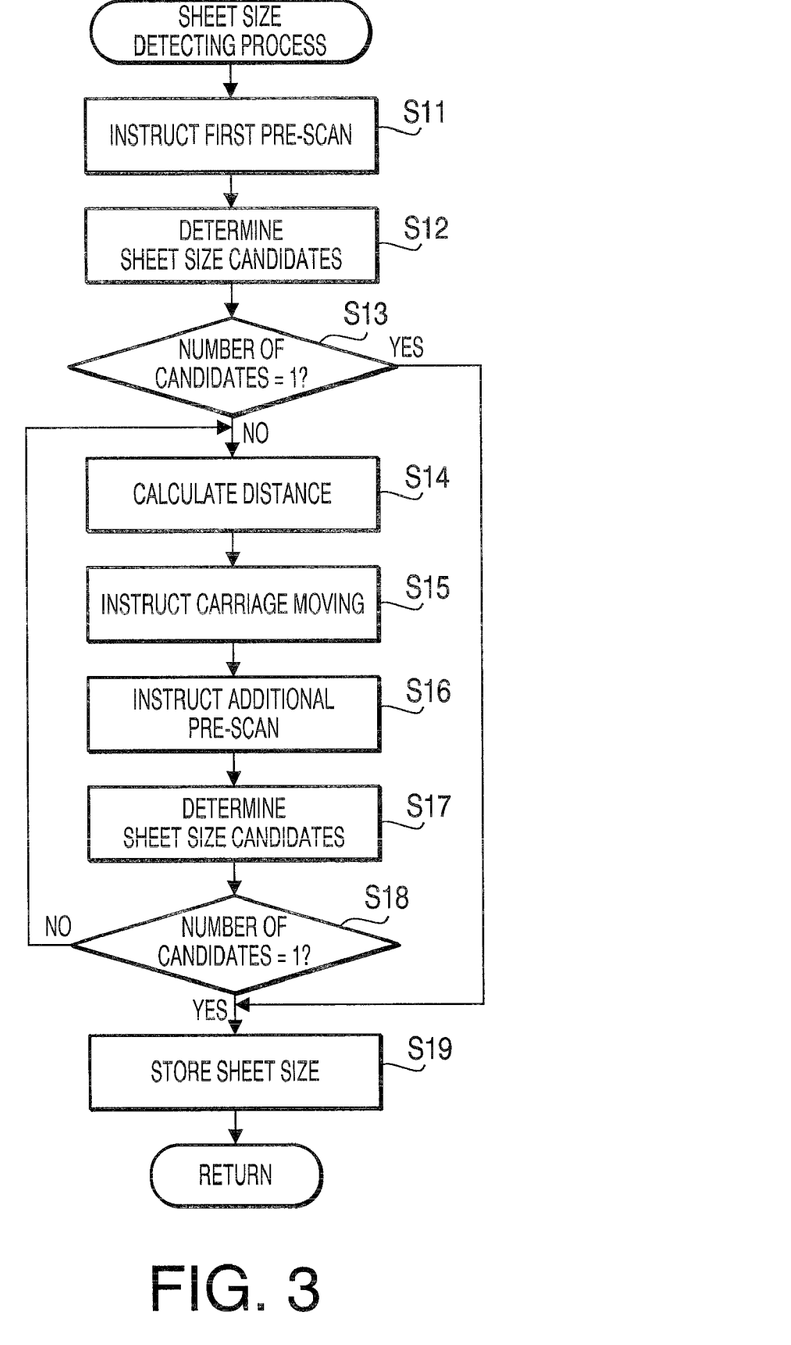
FIG. 3 shows a flowchart illustrating the sheet size detecting process executed by a CPU of the MFP according to the exemplary embodiment of the present invention.

Next, the sheet size detecting process is described. The sheet size detecting process is a process to detect a size of the original 200 placed onto the platen 106. The sheet size detecting process shown in FIG. 3 is started when the original 200 is placed on the platen 106, the cover 107 is closed, and a predetermined button of the operation panel 105 is depressed. Note that, as substitute for starting the sheet size detecting process by the operation of the operation panel 105, the sheet size detecting process may be started when an instruction signal is received from a device (such a PC) connected to the MFP 100.

Figure 4:
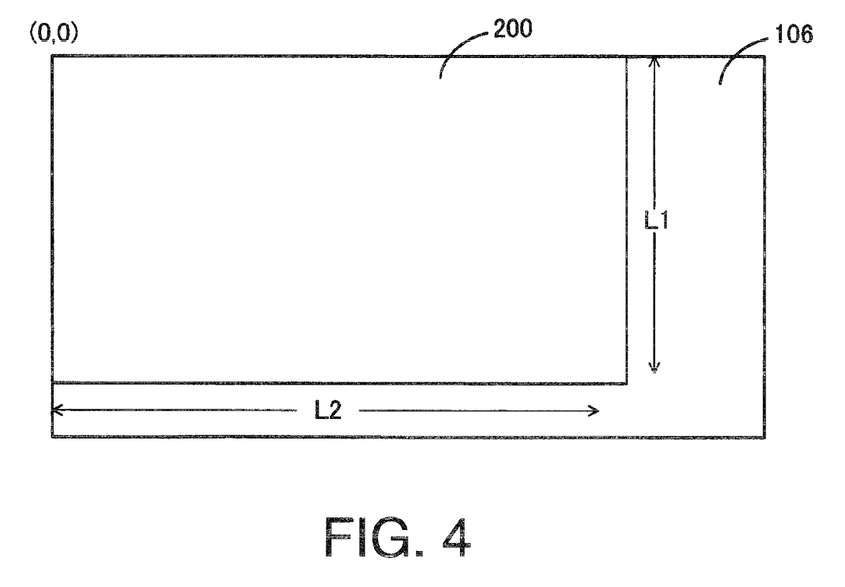
FIG. 4 schematically shows an appearance of an original placed on a platen of the MFP according to the exemplary embodiment of the present invention.

FIG. 4 shows an appearance when the original 200 (size: L1×L2) is placed on the platen 106. For describing the size of the original 200, the upper left corner of the platen 106 in FIG. 4 is defined as an origin of two-dimensional inordinate system representing position on an area of the platen 106, i.e., the two-dimensional coordinate system is defined with the auxiliary scanning direction (X-direction in FIG. 1) and the main scanning direction (Y-direction in FIG. 1). In S11 shown in FIG. 3, the CPU 121 outputs an instruction of a first pre-scan operation. When the first pre-scan operation starts, the carriage log emits the light toward the original 200 placed on the platen 106. In addition, the drive mechanism drives the carriage 108 to move along the auxiliary scanning direction by a predetermined distance D2 in FIG. 5. The predetermined distance D2 is defined as a "scan section" in which a pre-scan operation is performed. In the scan section, the imaging unit performs a photoelectric conversion for the light which is reflected from the original 200 and is incident on the image sensor equipped in the imaging unit. Then, the imaging unit stores the image data generated by the photoelectric conversion into the RAM 123. Due to the instruction of the first pre-scan operation, the image data in the scan section corresponding to the first pre-scan, i.e., a pre-scan image around the one end of the original is generated and stored in the RAM123.

Figure 5:
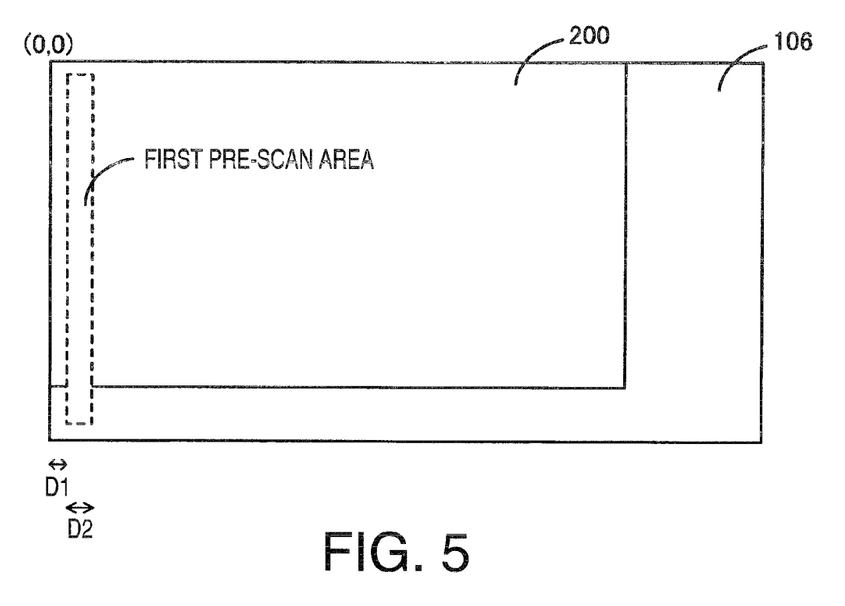
FIG. 5 schematically shows a positional relationship among the platen, a first pre-scan area, and the original placed on the platen of the MFP according to the exemplary embodiment of the present invention.

In FIG. 5, an area from the leftmost edge of the platen 106 to a distance D1 in the auxiliary scanning direction is an area where the scanning operation is unable to be performed because of the structure of the image scanner 100. Note that, in FIG. 5, the distance D2 may be set appropriately. For example, it may be set to 30 mm (millimeters). Furthermore, a scan resolution in the pre-scan section may be set appropriately.

In S12 (FIG. 3), the CPU 121 determines sheet size candidates of the original 200. Specifically, the CPU 121 detects a position of an edge of the original 200 in the main scanning direction, i.e., a width of the original 200, by performing a well-known image processing to the image data acquired in S11. Next, the CPU 121 determines the candidates for a length of the sheet size based on the position of the edge of the original 200 detected in S11 (i.e., a detected width of the original 200 in FIG. 6) and the first table shown in FIG. 6.

Figure 6:
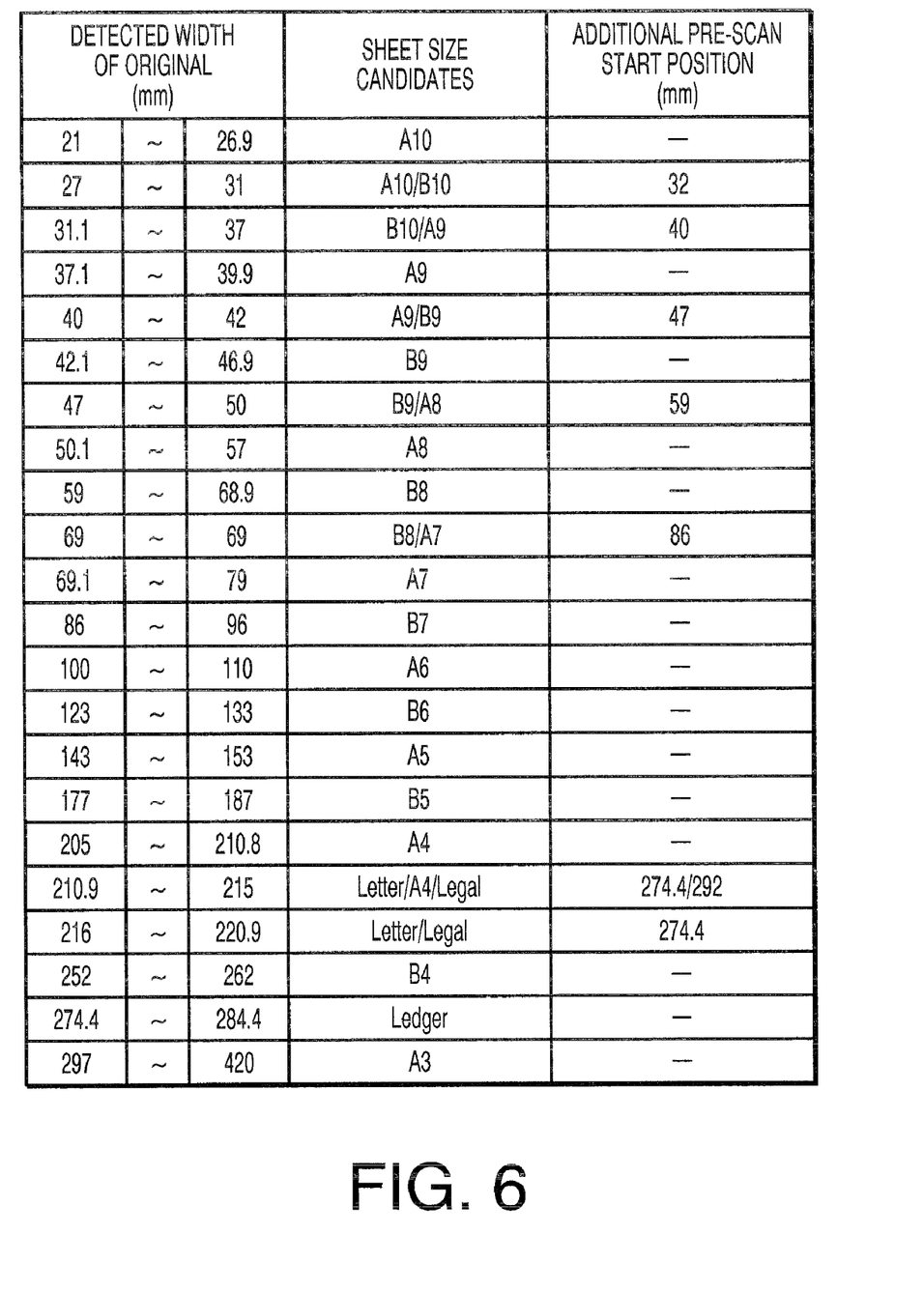
FIG. 6 shows an example of a configuration of a first table.

As shown in FIG. 6, in the first table, the sheet size candidates and an additional pre-scan start position corresponding to the detected width of the original are respectively defined. In a row of the sheet size candidates, at least one candidate of the sheet size corresponding to the detected width of the original is defined. By referring to the first table, the CPU 121 determines the sheet size candidates based on the width of the original detected in S11. The additional pre-scan start position represents start positions of an additional pre-scan operation described later.

For example, when the width of the original detected in S11 is "38 mm," "A9" is determined as the sheet size candidates. In such a case, the number of the sheet size candidates is recognized as "1" by the CPU 121. Alternatively, when the width of the original detected in S11 is "48 nm," "B9 and A8" are determined as the sheet size candidates. In such a case, the number of the sheet size candidates is recognized as "2" by the CPU 121. Furthermore, when the width of the original detected in 11 is "211 mm," "Letter, A4 and Legal" are determined as the sheet size candidates, and the number of the sheet size candidates is recognized as "3" by the CPU 121. Note that, in the following description, the number of the sheet size candidates is referred to as "CN." The value of the "CN" is stored in the RAM 123.

Figure 7:
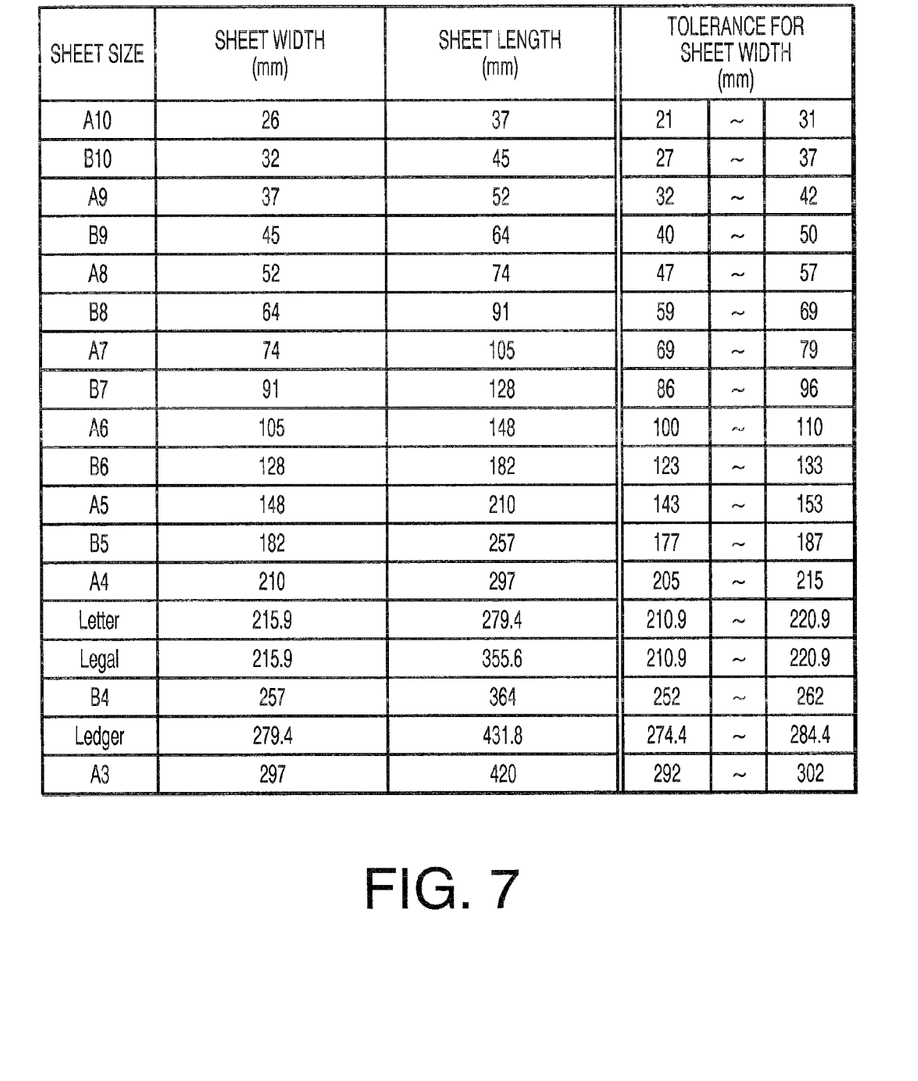
FIG. 7 shows an example of a configuration of a second table.

The first table is created based on the second table shown in FIG. 7. As shown in FIG. 7, in the second table, a sheet width, a sheet length and a tolerance for the sheet width are defined to each sheet size.

The sheet width represents a width of each sheet size. The sheet length represents a length of each sheet size. The tolerance for the sheet width represents a tolerance in which the edge of the original 200 in the main scanning direction is detected. In the exemplary embodiment, a length from –5 mm to +5 mm for each sheet width is set as the tolerance for the sheet width.

For example, in the second table, a sheet of "B9" is defined as a sheet of which the sheet width is "45 mm" and the sheet length is "64 mm." In addition, if the width of the original 200 detected in S11 is within a tolerance from "40 mm" to "50 mm," the sheet size of "B9" is recognized by the CPU 121 as the sheet size candidates in the first table.

In the second table, when the sheet width is "34 mm," both of the sheet sizes of "B10" of which the sheet width is within a tolerance from "27 mm" to "37 mm" and "A9" of which the sheet width is within a tolerance from "32 mm" to "42 mm" emerge as candidates. Thus, in the first table, "B10" and "A9" are defined as the sheet size candidates in a range, to which "34 mm" belongs, of the detected width of the original "31.1 mm" to "37 mm."

Additionally, in the second table, when the sheet is "212 mm," the sheet sizes of "A4," "Letter," and "Legal" emerge as the sheet size candidates because the width of the original (212 mm) is within a tolerance for the sheet size of "A4" (205 mm to 215 mm), within a tolerance for the sheet size of "Letter" (210.9 mm to 220.9 mm) and within a tolerance for the sheet size of "Legal" (210.9 mm to 220.9 mm). Thus, in the first table, "Letter," "A4" and "Legal" are defined as the sheet size candidates when the width of the original is "212 mm," because it belongs to a predetermined range of the detected width of the original (210.9 mm to 215 mm). Note that the range of the detected width of the original in the first table is assigned in advance so as to narrow down the sheet size candidates properly.

Note that, the value of the additional pre-scan start position defined in the first table is 5 mm smaller, i.e., shorter than the sheet length defined in the second table such that the edge, in the auxiliary scanning direction, of the original 200 is reliably included in the scan section in which the additional pre-scan operation is performed. Note that, the value of the additional pre-scan start position may be set arbitrarily. When the original 200 is placed aslant to the platen 106, a detected position of the edge of the original 200 in S11 does riot correspond to the sheet length defined in the second table. Therefore, the value of the additional pre-scan start position may be determined by a tolerance for a gradient degree of the original 200.

As shown in FIG. 6, the additional pre-scan start position of "40" corresponds to the sheet size candidates of "B10/A9." Such value of the additional pre-scan start position is determined based on the sheet length of "B10" (45 mm) which is shorter than that of the sheet size of "A9" (52 mm).

In addition, in FIG. 6, the additional pre-scan start position of "274.4/292" corresponds to the sheet size candidates of "Letter/A4/Legal." Such value of the additional pre-scan start position is determined based on the sheet length of "Letter" (279.4 mm), which is the shortest sheet length among those of "Letter" (279.4 mm), "A4" (297 mm) and "Legal" (355.6 mm), and the sheet length of "A4" (297 mm) which is the second shortest sheet length among them.

Note that, in the exemplary embodiment, both the first table and the second table are stored beforehand in the ROM 122. However, the second table is only stored in the ROM 122, and the first table may be created based on the second table and be developed in the RAM 123.

Returning to FIG. 3, in S13, the CPU 121 judges whether the number of the sheet size candidates determined in S12 is "1." At this time, the value of "CN" stored in the RAM 123 is referred to by the CPU 121. When the CPU 121 judges that the number of the sheet size candidates is "1" (S13: YES), the process proceeds to S19. On the other hand, when the CPU 121 judges that the number of the sheet size candidates is not "1" (S13: NO), the process proceeds to S14.

Note that, the number of executions of S14 is stored by an execution counter provided in the RAM 123. When the process proceeds from S13 to S14, the value of the execution counter is incremented and is stored in the execution counter again. Hereinafter, the value of the execution counter is referred to as "SC."

In S14, a distance of the carriage 108 to be moved is determined by the CPU 121. A manner of the determination of the distance is described as follows. At first, a position of carriage 108 to be moved is specified. At this time, the first table is referred to by the CPU 121. For example, when the "SC" is equal to "1" and "Letter, A4 and Legal" are determined as the sheet size candidates, the position of carriage 108 to be moved is determined as "274.4 mm," i.e., the CPU 121 selects the first value counted from the left, i.e., the smallest value among values listed as the additional pre-scan start position (274.4/292).

At this moment, as the carriage 108 is located at the end of the position where the first pre-scan operation has been performed, i.e., a distance "D1+D2" away from the one end of platen 106, the distance of the carriage 108 to be moved is calculated with a formula "274.4−(D1+D2)." Namely, when the distance of the carriage 108 is represented as "M1" and the value of the additional pre-scan start position in the first table is represented as "C1," the distance of the carriage 108 is calculated with a formula (1):

$$M1 = C1 - (D1 + D2) \tag{1}$$

Figure 8:
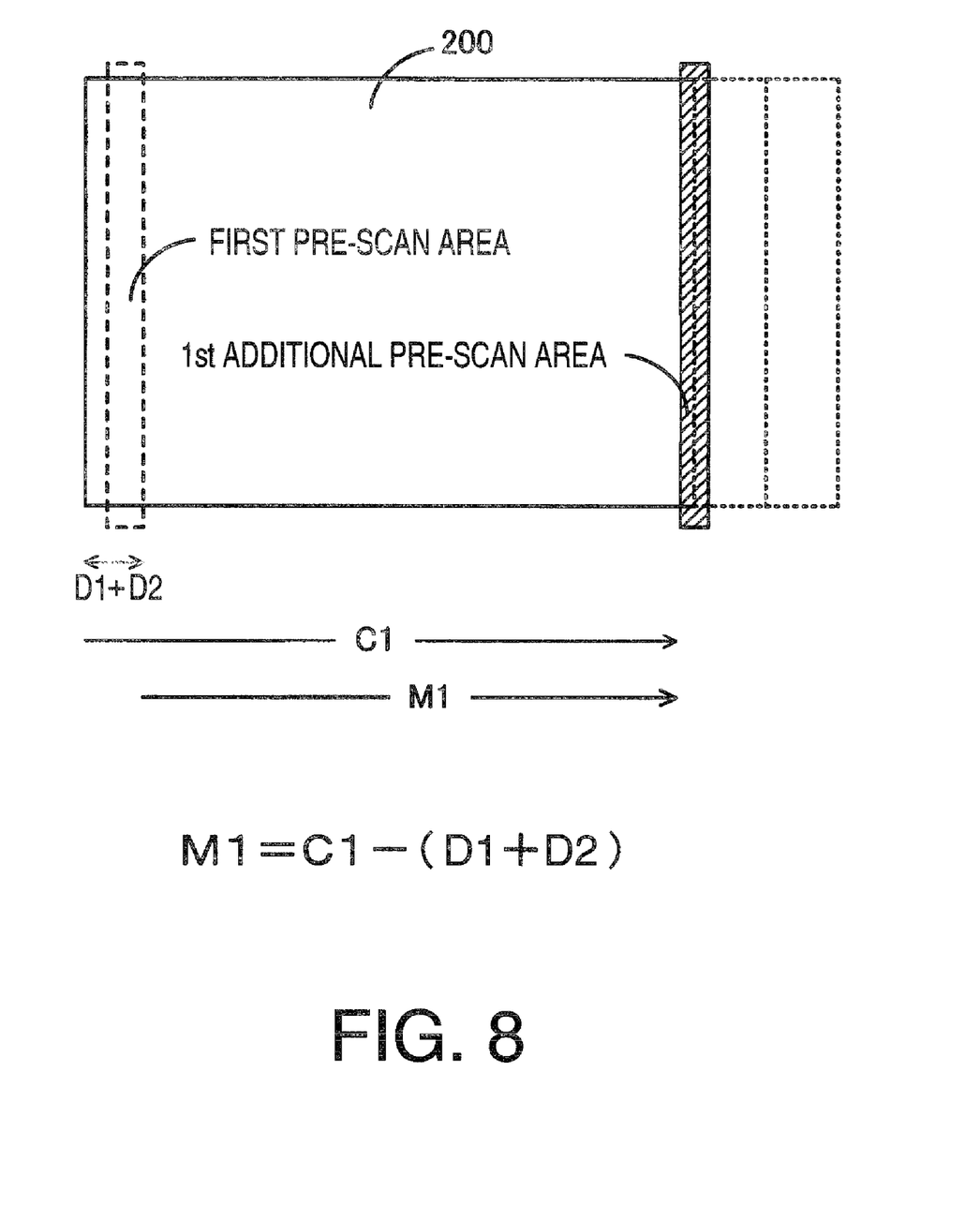
FIG. 8 shows a state where a carriage has moved from a first pre-scan area to a 1st additional pre-scan area.

FIG. 8 shows a state where a carriage has moved in such a case.

In S15, the CPU 121 outputs an instruction of a carriage moving. Thereby, the carriage 108 moves only by the distance calculated in S14 in the auxiliary scanning direction. In addition, the moving speed of the carriage 108 at this time is faster than that of the pre-scan operation. Note that, an area, in which the carriage 108 is moved by the carriage moving instruction in S15, is defined as a "non-scan section" in which the pre-scan operation is not performed.

In S16, the CPU 121 outputs an instruction of the additional pre-scan operation. Thereby, the carriage 108 emits the light toward the original 200 placed on the platen 106, in addition, the drive mechanism drives the carriage 108 to move by a predetermined distance D3 in the auxiliary scanning direction. An area, in which the carriage 108 is moved for the additional pre-scan operation, is defined as "scan section" in which the additional pre-scan operation is performed. Thus, the imaging unit performs the photoelectric conversion for the light which is reflected from the original 200 and is incident on the image sensor equipped in the imaging unit, and the imaging unit stores the image data generated by the photoelectric conversion into the RAM 123. Due to the additional pre-scan instruction, the image data in the scan section corresponding to the additional pre-scan, i.e., a pre-scan image within the scan section, is generated and stored in the RAM 123.

In 517, the CPU 121 determines the sheet size candidates. Herein, the CPU 121 judges whether an edge, in the auxiliary scanning direction, of the original 200 exists in the scan section corresponding to the additional pre-scan operation, by processing the image data acquired in S16.

Here, when the number of the sheet size candidates is "2" (CN=2) at a time when the process proceeds to S17, the number of the sheet size candidates is decremented to "1." That is, the CPU 121 identifies the sheet size by S17.

For example, when the sheet size candidates are "B10 and A9" and the edge of original 200 is detected as a result of the image processing to the image data acquired by the additional pre-scan operation, the sheet size is identified as "B10," i.e., the number of the sheet size candidates becomes "1." In contrast, when the edge of original 200 is not detected in such a case, the sheet size candidates is identified "A9," i.e. the number of the sheet size candidates becomes to be "1."

In addition, when the number of the sheet size candidates is equal to or larger than "3" at a time when the process proceeds to S17, the number of the sheet size candidates becomes "plural" or "1" after S17. That is, there are two cases, one is that the sheet size is identified by S17, the other is that the sheet size is not identified by S17.

For example, when the sheet size candidates are "Letter, A4 and Legal" and the edge of the original 200 is detected as a result of the image processing to the image data captured at a position where the additional pre-scan start position is "274.4 mm" (i.e., at the 1st additional pre-scan operation), the value of the "CN" is set to "1" because the sheet size is identified as "Letter." Namely, the number of the sheet size candidates becomes "1." However, when the edge of the original 200 is not detected in the 1st additional pre-scan, the value of the "CN" is decremented because "Letter" is deleted from the sheet size candidates and the sheet size candidates are determined as "A4 and Legal." Namely, the number of the sheet size candidates becomes "2."

In S18, the CPU 121 judges whether the number of the sheet size candidates determined in S17 is "1." At this time, the value of the "CN" stored in the RAM 123 is referred to by the CPU 121. When the CPU 121 determines that the number of the sheet size candidates is "1" (S 18: YES), the process proceeds to S19. On the other hand, when the CPU 121 determines the number of the sheet size candidates is not "1" (S18: NO), the process returns to S14. Then, when the process returns to S14, the value of the execution counter "SC" is incremented.

A process performed in S14 after returning from S18 is described as follows. In the following description, it is presumed that the sheet size candidates are judged as "Letter, A4 and Legal" in S12 and the sheet size candidates are determined as "A4 and Legal" by the first process of S17.

As the value of the "SC" is "2" when the process returns to S14, the additional pre-scan start position is determined as "292 mm" which is the second shortest value among the listed values (274.4/292) in the additional pre-scan start position of the first table.

Then, as the carriage 108 is located at a position where the 1st additional pre-scan operation is terminated, i.e., a distance "C1+D3" away from the one end of platen 106, a distance of the carriage 108 to be moved is calculated with "292−(C1+D3)." Namely, when the distance of the carriage 108 is represented as "M2" and the value of "the additional pre-scan start position" in the first is represented as "C2." the distance of the carriage 108 is calculated with a formula (2):

$$M2 = C2 - (C1 + D3) \tag{2}$$

Figure 9:
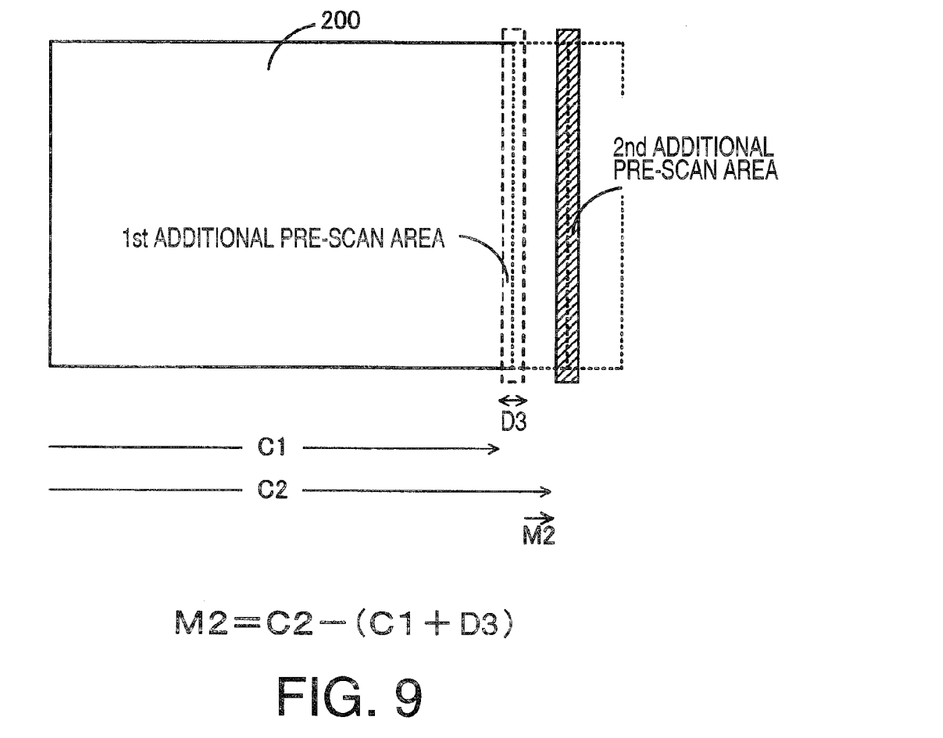
FIG. 9 shows a state where a carriage has moved from the 1st additional pre-scan area to a 2nd additional pre-scan area.

FIG. 9 shows a state where a carriage has moved in such a case.

When the sheet size candidates are "A4 and Legal" and the edge of the original 200 is detected as a result of the image processing to the image data captured at a position where a 2nd additional pre-scan start position is performed, the sheet size is identified as "A4," i.e., the number of the sheet size candidates becomes "1." In contrast, when the edge of original 200 is not detected in the 2nd additional pre-scan, the sheet size is identified as "Legal," i.e., the number of the sheet size candidates becomes "1" without a further additional pre-scan.

Similarly, when the sheet size candidates are judged as "Letter, A4 and Legal" in S12, i.e., when the number of the sheet size candidates is "3," the additional pre-scan operations are performed twice at a maximum.

In general, when the number of the sheet size candidates is determined to be "N" at S12, the additional pre-scan operations are performed "N−1" times at a maximum.

Returning to FIG. 3, in S19, the CPU 121 stores the sheet size, which is identified in S13 or S18, into the RAM 123. Then, stored information related to the sheet size is referred to in other processes. In addition, the CPU 121 outputs an instruction to move the carriage 108 to an initial position.

According to the exemplary embodiment described above, when a plurality of sheet size candidates are determined based on the first pre-scan, the same number of lengths are obtained as the candidates for the sheet length. Once the lengths to be examined have been determined, the scan sections and the non-scan sections can be determined. Then, the sheet size is identified by a result of the image processing to the image data generated by the additional pre-scan operation performed in the determined scan section. Furthermore, the carriage 108 is moved faster in the non-scan section than in the scan section since the carriage 108 does not capture an image in the non-scan section. Therefore, the sheet size can be detected faster in comparison with a case where the carriage is moved at the same speed in both the scan section and non-scan section.

Figure 10:
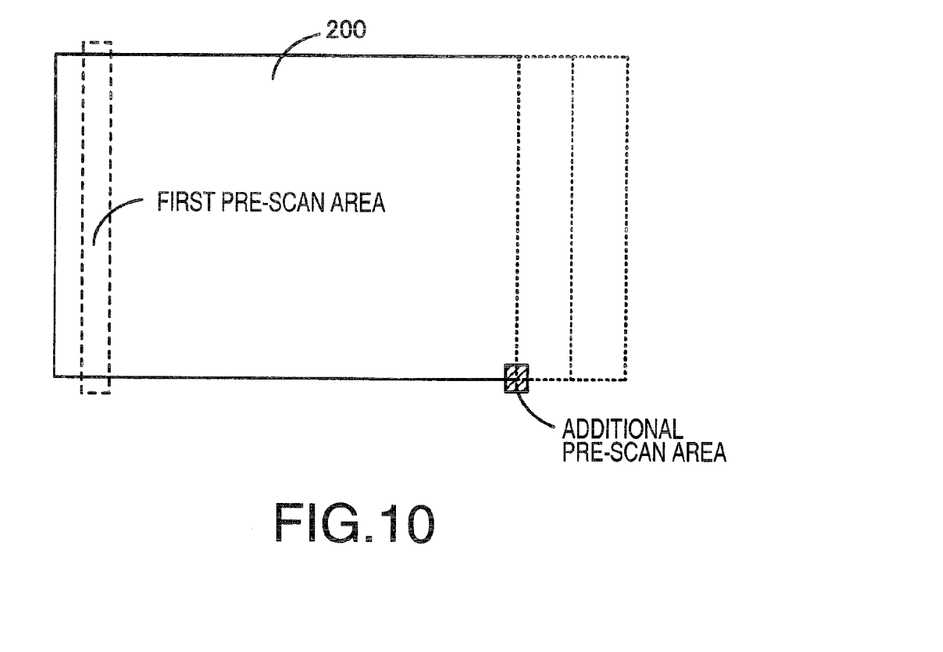
FIG. 10 shows a positional relationship among the original placed on the platen of the MFP, the first pre-scan area, and an additional pre-scan area according to the modified embodiment of the present invention.

In the exemplary embodiment as described above, the additional pre-scan area is defined as an area corresponding to a whole width of the original in the scan section, but the additional pre-scan area may be defined using a part of the width of the original. In such a case, the sheet size can be detected much faster because the image processing for detecting the edge of the sheet can be performed with respect to only a small object area in which the edge of the sheet is expected to be included. In addition, as the width of the original 200 is detected by the first pre-scan, the additional pre-scan area may be defined as an area including one of corners of the original 200 as shown in FIG. 10. Thereby, the image processing for detecting the edge of the sheet is performed reliably and the sheet size can be detected much faster.

In a printing process using a printing mechanism, a printing magnification can be determined automatically based on the sheet size detected by the sheet size detecting process and a size of print sheets stacked in the sheet cassette 102. For example, when a B5 size sheet is placed on the platen 106 and A4 size print sheets are stacked in the sheet cassette 102, the CPU 121 can determine the printing magnification to "1.154" automatically.

It should be noted that the present invention should not be limited to the configuration described above, but can be modified in various ways without departing from the scope/aspects of the invention.

In addition, the flowchart described above is just an example, and other flowcharts may be applicable to the sheet size detecting process as far as the same results are obtained.

Furthermore, aspects of the present invention may be applicable to a program which is executable by a personal computer and storage media which stores the program.

What is claimed is:

1. An image scanner configured to detect a size of an original, comprising:
   a carriage configured to emit light to an original, which is placed on a platen, along a main scanning direction, the carriage being movable in an auxiliary scanning direction;
   a driving mechanism configured to drive the carriage to move; and
   an image processing unit configured to process image signal which is obtained based on light reflected from the original;
   the image processing unit including:
      a candidate determining unit configured to determine at least one candidate size of the original based on a pre-scan image of the original scanned at a position in the vicinity of one end, in the auxiliary scanning direction;
      a candidate length determining unit configured to determine candidate lengths for the original if there are multiple candidate sizes;
      a scan/non-scan section determining unit configured to determine a non-scan section and a scan section in the auxiliary scanning direction based on the candidate lengths; and
      a sheet size detecting unit configured to detect the size of the original based on the pre-scan image of the original scanned at the scan section;
   wherein the driving mechanism moves the carriage at a first speed in the scan section and at a second speed in the non-scan section, the second speed being faster than the first speed.

2. The image scanner according to claim 1, wherein
   the image processing unit determines first to N-th (N being a natural number) candidate sizes, a candidate length corresponding to a K-th candidate size being shorter than that of a (K+1)-th candidate size (K being a natural number equal to or smaller than N−2),
   if the sheet size detecting unit fails to detect the size of the original by executing a scanning at the scan section corresponding to the K-th candidate size, the driving mechanism moves the carriage to the scan section corresponding to the (K+1)-th candidate size, while if the sheet size detecting unit detects the size of the original by executing a scanning at the scan section corresponding to the K-th candidate, the driving mechanism moves the carriage to the initial position.

3. The image scanner according to claim 1,
   wherein a sheet size detecting unit detects the size of the original based on the pre-scan image of the original scanned at a part of the scan section.

4. The image scanner according to claim 3,
   wherein the part of the scan section is an area which is expected to include a portion in the vicinity of one of corners of the original.

5. The image scanner according to claim 1, further comprising:
   a tray configured to accommodate print sheets; and
   a print mechanism configured to print a piece of the print sheets; and
   wherein the print mechanism prints the image, which is scanned by the carriage, at a print magnification determined by the detected size of the original and the size of the print sheets.

6. An image scanner configured to detect a size of an original, comprising:
   a scanning unit configured to capture an image, in a main scanning direction, of the original placed on a platen, the scanning unit being movable in an auxiliary scanning direction;
   a scanning unit moving mechanism configured to move the scanning unit in the auxiliary scanning direction, a two-dimensional image of the original being scanned as the scanning unit moves in the auxiliary scanning direction with capturing the image in the main scanning direction; and
   an image processing unit configured to process the image of the original scanned by the scanning unit,
   the image processing unit includes:
      a candidate determining unit configured to determine at least one candidate size of the original based on a width of the original obtained by scanning a part of the image of the original at an initial position for scanning an area in the vicinity of one end, in the auxiliary scanning direction, of the original; and a scan/non-scan section determining unit configured to determine a non-scan section and a scan section in the auxiliary scanning direction based on the at least one candidate size;

wherein the scanning unit moving mechanism moves the scanning unit at a first speed in the scan section and at a second speed, which is faster than the first speed, in the non-scan section, and wherein the scanning unit scans the image of the original in the scan section and does not scan the image in the non-scan section.

7. The image scanner according to claim 6, wherein the image processing unit further includes a sheet size detecting unit configured to detect the size of the original by determining that the size of the original is equal to the at least one candidate size if the other end of the original is detected by executing a scanning at the scan section.

8. The image scanner according to claim 7, wherein the sheet size detecting unit executes the scanning at a part of the scan section.

9. The image scanner according to claim 8, wherein the part of the scan section is an area which is expected to include a portion in the vicinity of one of corners of the original.

10. The image scanner according to claim 7, wherein the scanning unit moving mechanism moves the scanning unit to the initial position when the sheet size detecting unit detects the size of the original.

11. The image scanner according to claim 7, wherein the image processing unit determines first to N-th (N being a natural number) candidate sizes, a length of the candidate size corresponding to a K-th candidate size being shorter than that of a (K+1)-th candidate size (K being a natural number equal to or smaller than N−2), if the sheet size detecting unit fails to detect the size of the original by executing a scanning at the scan section corresponding to the K-th candidate, the scanning unit moving mechanism moves the scanning unit to the scan section corresponding to the (K+1)-th candidate, while if the sheet size detecting unit detects the size of the original by executing a scanning at the scan section corresponding to the K-th candidate, the scanning unit moving mechanism moves the scanning unit to the initial position.

12. The image scanner according to claim 7, farther comprising:

a tray configured to accommodate print sheets; and a print mechanism configured to print a piece of the print sheets; and wherein the print mechanism prints the image, which is scanned by the scanning unit, at a print magnification determined by the detected size of the original and the size of the print sheets.

13. The image scanner according to claim 6, wherein the scan section is an area in the vicinity of one end, in auxiliary scanning direction, of A sheet corresponding to the at least one candidate size.

14. The image scanner according to claim 6, wherein the candidate determining unit determines the at least one candidate size when the width of the original is included in a predetermined tolerance corresponding to a width of the at least one candidate size.

15. A method of detecting a size of an original placed on a platen of an image scanner, the scanner comprising an image scanning unit configured to scan an image of the original in a main scanning direction at a time and a scanning unit moving mechanism configured to move the image scanning unit in an auxiliary scanning direction, comprising the steps of:

locating the scanning unit at an initial position to detect a width of the original;

first determining at least one candidate size based on the detected width;

second determining a non-scan section in which an end of the original would not exist and a scan section where the end of the original could exist, based on at least one candidate length corresponding to the at least one candidate size, in the auxiliary scanning direction;

moving the scanning unit in the non-scan section at a first speed and scan section at a second speed, the first speed being faster than the second speed;

examining whether an end of the original is detected in the scan section; and identifying that the size of the original is the candidate size corresponding to the scan section when the end of the original is detected in the scan section.

16. The method according to claim 15, wherein, when the number of the candidate sizes is N (N being a natural number), candidate lengths are subsequently defined from first to N-th candidate lengths for the additional scans, and wherein the method further comprises a step of identifying that the size of the original is equal to a candidate size corresponding to the N-th candidate length when the end of the original is not detected in the scan section corresponding to an (N−1)-th candidate length.

* * * * *